(12) United States Patent
Shibata et al.

(10) Patent No.: US 8,744,724 B2
(45) Date of Patent: Jun. 3, 2014

(54) ENGINE CONTROLLING APPARATUS

(75) Inventors: Koji Shibata, Okazaki (JP); Katsunori Ueda, Okazaki (JP); Toshiyuki Miyata, Okazaki (JP); Hitoshi Toda, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 693 days.

(21) Appl. No.: 13/070,810

(22) Filed: Mar. 24, 2011

(65) Prior Publication Data
US 2012/0083993 A1 Apr. 5, 2012

(30) Foreign Application Priority Data

Oct. 1, 2010 (JP) .................................. 2010-224015

(51) Int. Cl.
F02D 43/00 (2006.01)
F02D 29/00 (2006.01)
F02D 29/02 (2006.01)
F02M 3/00 (2006.01)

(52) U.S. Cl.
USPC .................. 701/103; 123/339.11; 701/84

(58) Field of Classification Search
USPC .................. 701/103, 105, 101, 102, 84, 90; 123/339.11, 339.16, 406.11, 406.13, 123/406.23, 406.26, 406.33
See application file for complete search history.

(56) References Cited

U.S. PATENT DOCUMENTS

| 5,662,084 | A | 9/1997 | Deguchi et al. |
| 6,513,489 | B2* | 2/2003 | Osanai ..................... 123/339.11 |
| 7,143,741 | B2* | 12/2006 | Yagi ......................... 123/339.11 |
| 7,472,686 | B2* | 1/2009 | Yasui et al. ................... 701/105 |
| 8,594,905 | B2* | 11/2013 | Shiomi et al. ................. 701/103 |
| 2006/0102143 | A1 | 5/2006 | Yagi |
| 2010/0236521 | A1 | 9/2010 | Shiomi et al. |

FOREIGN PATENT DOCUMENTS

| EP | 1411232 A2 | 4/2004 |
| GB | 2279697 A | 1/1995 |
| JP | 2-291448 A | 12/1990 |
| JP | 9-32612 A | 2/1997 |
| JP | 2004-197723 A | 7/2004 |
| JP | 2006-138300 A | 6/2006 |
| JP | 2008-297946 A | 12/2008 |

* cited by examiner

Primary Examiner — Hieu T Vo
(74) Attorney, Agent, or Firm — Birch, Stewart, Kolasch & Birch, LLP

(57) ABSTRACT

An engine controlling apparatus includes a setting unit that sets a demand torque to an engine, a detection unit that detects a fluctuation of an external load, and a correction unit that corrects the demand torque. The apparatus includes a target torque calculation unit that calculates a target torque based on the demand torque, a control unit that controls an amount of air to be introduced into the engine so that an output torque may come close to the target torque, and an ignition timing detection unit that detects an ignition timing of the engine. The correction unit adds a torque increment for coping with a fluctuation of the external load to the demand torque to determine an increment correction demand torque and increases or decreases the increment correction demand torque in response to a displacement amount of the ignition timing from a predetermined reference value.

10 Claims, 6 Drawing Sheets

ENGINE CONTROLLING APPARATUS

CROSS-REFERENCE TO THE RELATED APPLICATION

This application incorporates by references the subject matter of Application No. 2010-224015 filed in Japan on Oct. 1, 2010 on which a priority claim is based under 35 U.S.C. §119(a).

FIELD

The embodiments disclosed herein are related to a controlling apparatus for controlling an engine mounted on a vehicle.

BACKGROUND

As one of controlling methods for an engine mounted on a vehicle, torque-based (torque demand) control for controlling the intake air amount, fuel injection amount, ignition timing and so forth with reference to the magnitude of a torque demanded to an engine is available. In the torque-based control, the engine is controlled such that, for example, a target value for an engine torque is calculated based on the acceleration opening, engine speed and so forth and a torque having the target value is acquired. Further, in a vehicle in which an external controlling system such as an automatic transmission, an automatic cruise apparatus or a vehicle stabilization apparatus is incorporated, output power demands from the several external controlling systems to the engine are converted into torques and unified by an engine ECU (engine electric controlling apparatus) and then a torque behavior of the engine is comprehensively controlled.

Incidentally, an output power demand to the engine possibly varies not only upon running of the vehicle but also during stopping of the vehicle. For example, if a shift lever operation of an automatic transmission or a starting operation for an external load apparatus such as an air conditioning apparatus or various electric equipments is inputted, then the load acting upon the engine increases in response to the operation. Therefore, it becomes necessary to increase the output power of the engine. Particularly upon idling, the engine speed is lower than that upon traveling of the vehicle and is liable to be influenced by an external load, and the operation condition of the engine is liable to become unstable. Therefore, a technique is known that, as control upon idling, the ignition timing or the intake air amount is changed in response to the magnitude of the external load acting upon the engine to adjust the engine torque to maintain the engine speed at a predetermined idle speed.

For example, Japanese Patent Laid-Open No. 2008-297946 discloses a technique that ignition timing feedback control of controlling the ignition timing and air amount correction control of controlling the intake air amount are used to maintain the engine speed upon idling at an idle speed. In this technique, attention is paid to a difference in torque adjustment width between the ignition timing feedback control and the air amount correction control to carry out one of the controls based on the ignition timing at a point of time at which an external load demand is detected. It is considered that this makes it possible to maintain the engine speed as fixed as possible.

The magnitude of the external load acting upon the engine varies in response to an operation state of the external load apparatus. However, in such a prior art as described in Japanese Patent Laid-Open No. 2008-297946, since an influence of such variation of the external load is not taken into consideration, it is sometimes impossible to cause the actual engine torque to follow up the demand from the external load. Particularly upon idling which is liable to be influenced by an external load, such torque difference appears conspicuously, and there is a subject that it is difficult to assure stability in idle rotation.

Concerning this subject, also it is imaginable to assure the stability by normally advancing the ignition timing irrespective of the magnitude of the external load or by normally increasing the air amount. However, if such a high engine torque as can cover all possible load variations is outputted, then the energy loss increases, resulting in deterioration of the fuel cost.

SUMMARY

The present invention has been made in view of such subjects as described above, and it is an object of the present invention to improve the fuel cost while enhancing the stability of an operation state of an engine with a simple configuration.

It is to be noted that, in addition to the object described above, also it shall be understood as an object of the present invention to achieve such working effects as are provided by the constitutions of several modes for carrying out the present invention hereinafter described but are not provided by the conventional techniques.

An engine controlling apparatus disclosed herein includes a setting unit that sets a demand torque to an engine mounted on a vehicle, a detection unit that detects, based on a working state of an external load apparatus which applies an external load to the engine, a fluctuation of the external load, and a correction unit that corrects the demand torque set by the setting unit in response to a result of the detection by the detection unit.

The engine controlling apparatus further includes a target torque calculation unit that calculates a target torque for the engine based on the demand torque corrected by the correction unit, a control unit that controls an amount of air to be introduced into the engine so that an output torque of the engine may come close to the target torque calculated by the target torque calculation unit, and an ignition timing detection unit that detects an ignition timing of the engine.

Further, the correction unit adds, when a fluctuation of the external load is detected by the detection unit, a torque increment for coping with the fluctuation to the demand torque set by the setting unit to determine an increment correction demand torque and increases or decreases the increment correction demand torque in response to a displacement amount of the ignition timing detected by the ignition timing detection unit from a predetermined reference value.

The external load apparatus includes, for example, a speed change gear, an air conditioning apparatus, various electric equipments, a hydraulic power steering apparatus and so forth mounted on the vehicle. Further, it is imaginable to provide a sensor for detecting a working state of each external load apparatus (for example, an on/off state of a main power supply or a main switch) such that a fluctuation of the external load is detected based on detection information by the sensor.

With the engine controlling apparatus disclosed herein, the demand torque is corrected by an increment in response to a fluctuation of the external load and the demand torque corrected by the increment is increased or decreased in response to an ignition timing. Therefore, a target torque of an appropriate value can be set while such a situation that the target torque is set to an excessively high value is prevented, and consequently, the fuel cost can be improved while the stability of the operation state of the engine is enhanced.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DESCRIPTION OF EMBODIMENT

In the following, an engine controlling apparatus is described with reference to the drawings. It is to be noted that the embodiment hereinafter described is illustrative to the end, and there is no intention to eliminate various modifications and applications of the technique not specified in the embodiment hereinafter described.

[1. Apparatus Configuration]

Figure 1:
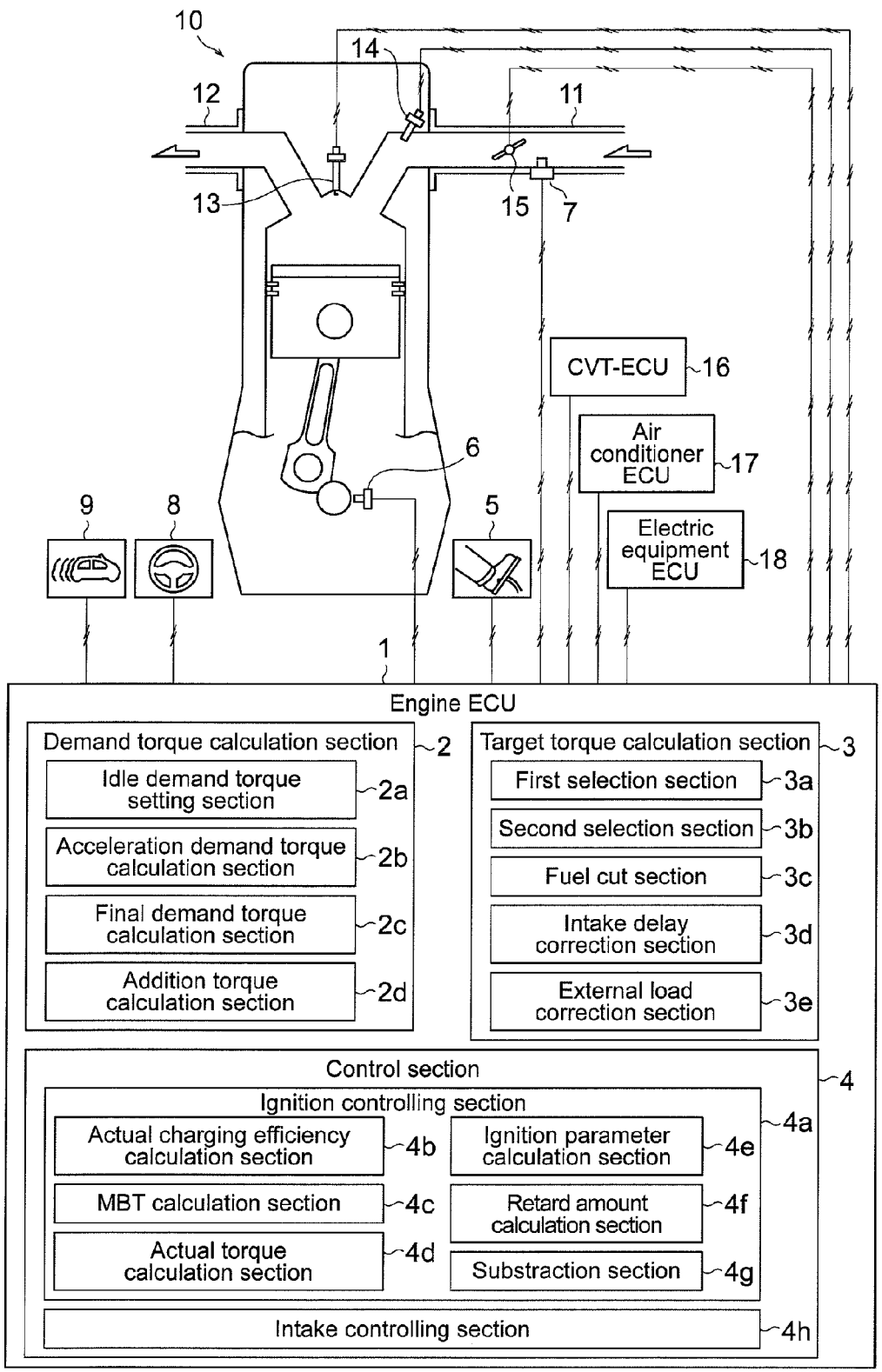
FIG. 1 is an example block diagram schematically depicting a configuration of a controlling apparatus for an engine according to an embodiment of the present invention.

A controlling apparatus of the present embodiment is applied to a vehicle-carried engine 10 shown in FIG. 1. Here, one cylinder from among a plurality of cylinders provided in the multi-cylinder four-cycle type engine 10 is shown. An ignition plug 13 is provided at the top of the cylinder in a state in which an end of the plug 13 is projected to the combustion chamber side. Further, an intake path 11 and an exhaust path 12 are connected to the top face of the cylinder head side of the combustion chamber.

An injector 14, an ETV 15 (Electric Throttle Valve) and an air flow sensor 7 (AFS, Air flow Sensor) are provided on the intake path 11 side. The injector 14 injects fuel into the intake path 11, and the ETV 15 is an electronically controlled throttle valve for changing the opening thereof to change the intake amount of air to be introduced into the cylinder. Meanwhile, the air flow sensor 7 is a sensor for detecting the intake air amount into the cylinder, and the intake flow rate Q which passes the ETV 15 is detected by the air flow sensor 7.

A crank angle sensor 6 (engine speed detection unit) for detecting the angle $\theta_{CR}$ of a crankshaft is provided in the engine 10. The angle $\theta_{CR}$ of the crankshaft detected by the crank angle sensor 6 and the intake flow rate Q detected by the air flow sensor 7 are transmitted to an engine ECU 1 hereinafter described. It is to be noted that an engine speed Ne can be grasped from a variation amount of the angle $\theta_{CR}$ per unit time. Accordingly, the crank angle sensor 6 has a function as means for detecting the engine speed Ne of the engine 10. The engine ECU 1 may be configured such that it calculates the engine speed Ne based on the angle $\theta_{CR}$ of the crankshaft detected by the crank angle sensor 6, or the crank angle sensor 6 may be configured such that the engine speed Ne is calculated in the inside of the crank angle sensor 6.

At an arbitrary position of the vehicle in which the engine 10 is incorporated, an acceleration pedal sensor 5 (APS, Acceleration pedal Position Sensor, acceleration operation amount detection unit) for detecting a treadling operation amount $\theta_{AC}$ of the acceleration pedal, a steering angle sensor 8 (SAD, Steering Angle Sensor, steering angle detection unit) for detecting the operation angle (steering angle) θ_SAS of a steering wheel, and a vehicle speed sensor 9 (vehicle speed detection unit) for detecting a vehicle speed V are provided. The operation amount $\theta_{AC}$ of the acceleration pedal, steering angle θ_SAS and vehicle speed V detected by the sensors are transmitted to the engine ECU 1.

It is to be noted that the treadling operation amount $\theta_{AC}$ of the acceleration pedal is a parameter corresponding to an acceleration demand of a driver and, in other words, a parameter correlating with a load to the engine 10. Further, the steering wheel of the vehicle in the present embodiment is configured such that the steering force thereof is assisted by a hydraulic power steering apparatus, and as the steering angle θ_SAS increases, the load to the engine 10 increases. Accordingly, also the steering angle θ_SAS is a parameter correlating with the load to the engine 10.

On this vehicle, the engine ECU 1 (Engine-Electronic Control Unit, engine electronic controlling apparatus), a CVT-ECU 16 (Continuously Variable Transmission ECU), an air conditioner ECU 17 and an electric equipment ECU 18 are provided as electronically controlled apparatus. Those electronically controlled apparatus are configured, for example, as an LSI device or a built-in device in which a microprocessor, a ROM, a RAM and so forth are integrated, and are connected to each other through a communication line of the CAN, FlexRay or the like provided on the vehicle.

The CVT-ECU 16 controls operation of a CVT apparatus (continuously variable transmission) not shown, and the air conditioner ECU 17 controls operation of an air conditioner (air conditioning apparatus) not shown. Further, the electric equipment ECU 18 controls operation of various electric equipments of the system such as a vehicle-carried floodlighting apparatus, various illumination apparatus, a power window apparatus and a door lock apparatus.

In the following, each of the electronic controlling apparatus other than the engine ECU 1 is referred to also as external controlling system, and an apparatus which is controlled by an external controlling system is referred to as external load apparatus. An operation state and so forth of the external load apparatus is variable irrespective of the operation state of the engine 10. Each of the external controlling systems described above calculates the magnitude of a torque demanded to the engine 10 from the external load apparatus as needed and transmits the calculated magnitude of the torque to the engine ECU 1. Further, a torque demanded to the engine 10 from an external controlling apparatus is referred to as external demand torque. It is to be noted that an external demand torque may be transmitted to the engine ECU 1 after it is calculated by each of the external controlling systems such as the CVT-ECU 16 or the air conditioner ECU 17 or may be calculated by the engine ECU 1 based on information collected by the individual external controlling systems.

The engine ECU 1 is an electronic controlling apparatus for controlling various systems such as an ignition system, a fuel system, an intake and exhaust system and a valve system relating to the engine 10. Here, the actual torque behavior of the engine 10 is managed by torque-based control. The torque-based control controls the intake air amount, fuel injection amount, ignition timing and so forth with reference to the magnitude of torque demanded to the engine 10. Operation of the ignition plug 13, injector 14 and ETV 15 described above is adjusted by the torque-based control. In this control, for example, an output power demand from the driver and output power demands from the external controlling systems are converted into torques, and the torques are decided synthetically to calculate a target value for the engine torque. Then, the intake air amount, fuel injection amount, ignition timing and so forth are controlled so that the torque of the target value may be obtained.

Further, the engine ECU 1 detects a variation of a load applied to the engine 10 from an external load apparatus and carries out torque-based control taking a torque increment for coping with the load variation into account. The variation of the load here signifies a transient load variation which occurs, for example, in response to a shift lever operation of the CVT apparatus or a starting operation of the air conditioning apparatus, hydraulic power steering apparatus and various electric equipments.

Generally, the magnitude of a load applied to the engine 10 from an external load apparatus stationarily exhibits a small fluctuation and seldom exhibits a sudden fluctuation. However, in such a transient state as at an instant immediately after a shift lever operation or a starting operation of various electric equipments, there is the possibility that the magnitude of the load may temporarily fluctuate suddenly before the load becomes stabilized. Therefore, the load fluctuation cannot be suppressed only with a torque into which an output power demand from the external controlling systems is converted, and the operation state of the engine sometimes becomes unstable. The torque increment is an added amount of torque for coping with such load fluctuation.

The torque-based control carried out by the engine ECU 1 in the present embodiment includes idle feedback control and fuel cut control. The idle feedback control is feedback control for bringing, in an idle state of the engine 10 in which a predetermined idle condition (a condition regarding, for example, the vehicle speed V or the treadling operation amount $\theta_{AC}$ of the acceleration pedal) is satisfied, the actual engine speed Ne close to the target idle speed and maintaining the engine rotation at the target idle speed. Meanwhile, the fuel cut control is control for stopping injection of fuel when a predetermined combustion cut condition (a condition regarding, for example, the engine speed Ne or the treadling operation amount $\theta_{AC}$ of the acceleration pedal) is satisfied.

[2. Control Configuration]

The engine ECU 1 includes a demand torque calculation section 2, a target torque calculation section 3 and a control section 4.

The demand torque calculation section 2 (setting unit) aggregates a torque demanded from the driver and torques demanded from the external controlling systems and calculates an acceleration demand torque Pi_APS, two different demand torques whose responsibilities to a controlling operation are different from each other, and an idle demand torque Pi_NeFB. Then, the demand torque calculation section 2 sets the calculated torques as demand torques to the engine 10.

The idle demand torque Pi_NeFB is a torque including a torque demanded to keep the operation state of the engine 10 in the idle state and so forth. Meanwhile, the acceleration demand torque Pi_APS is a torque including a torque demanded by the driver upon steady driving of the vehicle and so forth. Here, an ignition controlling demand torque Pi_EXT_SA and an intake controlling demand torque Pi_EXT are calculated based on the acceleration demand torque Pi_APS.

The ignition control in which the former torque is used is so-called high response torque control and controls the torque, for example, by an ignition timing operation or a fuel injection amount operation. Meanwhile, the intake control in which the latter torque is used is so-called low response torque control and controls the torque, for example, by an intake air amount operation represented by an operation of an electronically controlled throttle operation. Generally, the ignition control is high in responsibility although the adjustment margin of the torque is small while the intake control has a large adjustment margin although it is low in responsibility. The above-described idle demand torque Pi_NeFB, acceleration demand torque Pi_APS and two kinds of demanded torques calculated by the demand torque calculation section 2 are transmitted to the target torque calculation section 3.

The target torque calculation section 3 (target torque calculation unit) calculates target torques as two kinds of control targets based on the idle demand torque Pi_NeFB, acceleration demand torque Pi_APS or ignition controlling demand torque Pi_EXT_SA and intake controlling demand torque Pi_EXT calculated by the demand torque calculation section 2. Here, an ignition controlling target torque Pi_TGT (firs target torque) and an intake controlling target torque Pi_ETV_STD (second target torque) are calculated. The ignition controlling target torque Pi_TGT and the intake controlling target torque Pi_ETV_STD calculated here are transmitted to the control section 4.

The control section 4 feedback controls the intake air amount (actual charging efficiency Ec) and the ignition timing at the ignition plug 13 based on the two kinds of target torques calculated by the target torque calculation section 3. The opening of the ETV 15 is controlled based on the intake controlling target torque Pi_ETV_STD and the ignition timing at the ignition plug 13 is controlled based on the ignition controlling target torque Pi_TGT.

It is to be noted that the functions of the demand torque calculation section 2, target torque calculation section 3 and control section 4 may be implemented by an electronic circuit (hardware) or may be programmed as software or else may be implemented such that some of the functions are provided as hardware while the other functions are provided as software.

[2-1. Demand Torque Calculation Section]

Figure 2:
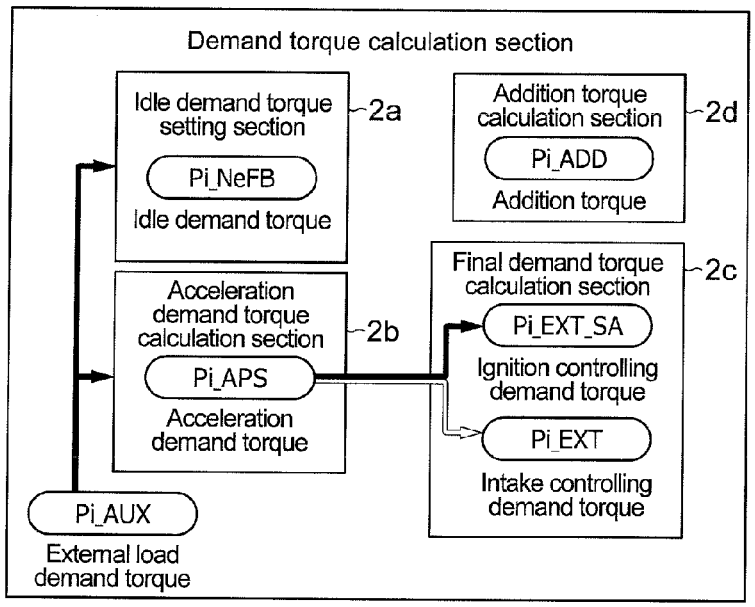
FIG. 2 is a block diagram illustrating a demand torque calculation section of the controlling apparatus.

As shown in FIG. 2, the demand torque calculation section 2 includes an idle demand torque setting section 2a, an acceleration demand torque calculation section 2b, a final demand torque calculation section 2c and an addition torque calculation section 2d.

The idle demand torque setting section 2a sets a target idle speed as a target value for the engine speed Ne when the engine 10 is in an idle state. This target idle speed is set suitably in response to a state of an external load apparatus such as, for example, a load of the air conditioner or an engine cooling water temperature. Further, the idle demand torque setting section 2a sets a torque corresponding to the set target idle speed (torque demanded to maintain the engine speed Ne at the target idle speed) as the idle demand torque Pi_NeFB. The idle demand torque Pi_NeFB set here is transmitted to the target torque calculation section 3.

It is to be note that the character Pi in the figure signifies an indicated mean effective pressure Pi, and here, the magnitude of the torque is represented using the indicated mean effective pressure Pi. In the present embodiment, not only a moment of force generated by the engine 10 but also a torque corresponding amount (pressure corresponding to a torque) represented by a mean effective pressure acting upon the piston of the engine 10 (for example, the indicated mean effective pressure Pi or the brake mean effective pressure Pe) are referred to as torque for the convenience of description.

The acceleration demand torque calculation section 2b (first calculation unit) calculates an acceleration demand torque Pi_APS based on the engine speed Ne obtained based on the angle $\theta_{CR}$ of the crankshaft and the operation amount $\theta_{AC}$ of the acceleration pedal. The acceleration demand torque Pi_APS is a parameter which makes a base of an output power target value of the engine upon steady operation of the vehicle.

The idle demand torque Pi_NeFB calculated by the idle demand torque setting section 2a and the acceleration demand torque Pi_APS calculated by the acceleration demand torque calculation section 2b individually include an external load demand torque Pi_AUX. The external load demand torque Pi_AUX is a torque corresponding to a steady load applied to the engine 10 by driving of the external load apparatus. A particular value of this external load demand torque Pi_AUX may be a predetermined value set in advance, for example, in response to a type or an operation state of the external load apparatus. Or the particular value may be stored as a uniform fixed value irrespective of the type of the external load apparatus.

The final demand torque calculation section 2c (second calculation unit) executes two types of calculation processes based on the acceleration demand torque Pi_APS calculated by the acceleration demand torque calculation section 2b. One of the processes is a process for calculating the ignition controlling demand torque Pi_EXT_SA as indicated by a black arrow mark in FIG. 2, and the other process is a process of calculating the intake controlling demand torque Pi_EXT as indicated by an arrow outline with a blank inside in FIG. 2. The ignition controlling demand torque Pi_EXT_SA and the intake controlling demand torque Pi_EXT are calculated independently of each other by the final demand torque calculation section 2c. The demand torques are torques aggregated taking an intention of the driver of the vehicle, the vehicle stability, a driving performance and so forth into consideration and are both transmitted to the target torque calculation section 3.

The addition torque calculation section 2d calculates a correction amount for the external load demand torque Pi_AUX described above, that is, a torque increment to be added taking an influence of a variation of an external load into consideration. Here, the addition torque calculation section 2d calculates a torque increment (margin to the torque) for coping with a variation of the external load as an addition torque Pi_ADD (increment correction demand torque). It is to be noted that a particular block configuration of the addition torque calculation section 2d is hereinafter described.

The addition torque Pi_ADD is a torque of a magnitude corresponding to a transient variation of the load which occurs, for example, in response to a shift lever operation of the CVT apparatus, a steering operation of the steering wheel, a starting operation of air conditioners or various electric equipments or the like. The value of the addition torque Pi_ADD is changed in response to the kind and the working state of the external load apparatus. The addition torque Pi_ADD calculated here is transmitted to the target torque calculation section 3.

[2-2. Target Torque Calculation Section]

Figure 3:
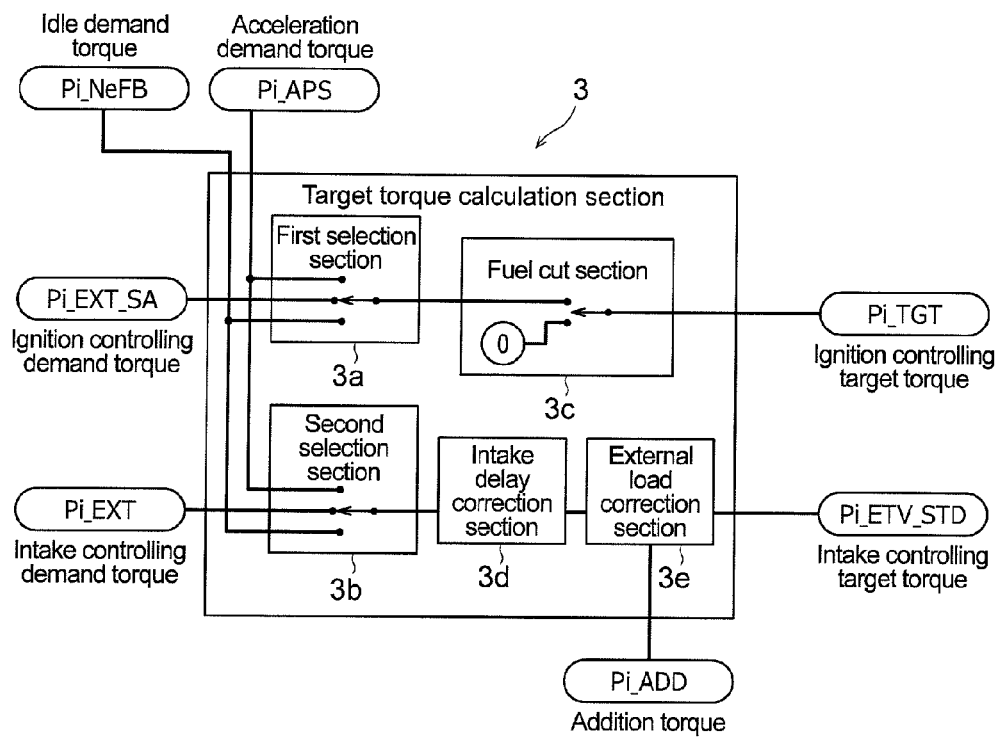
FIG. 3 is a block diagram illustrating a controlling process by a target torque calculation section of the controlling apparatus.

A calculation process by the target torque calculation section 3 is illustrated in FIG. 3. To the target torque calculation section 3, the idle demand torque Pi_NeFB, acceleration demand torque Pi_APS, ignition controlling demand torque Pi_EXT_SA, intake controlling demand torque Pi_EXT and addition torque Pi_ADD calculated or set by the demand torque calculation section 2 are inputted. This target torque calculation section 3 includes a first selection section 3a, a second selection section 3b, a fuel cut section 3c, an intake delay correction section 3d and an external load correction section 3e.

The first selection section 3a selects one of the ignition controlling demand torque Pi_EXT_SA, acceleration demand torque Pi_APS and idle demand torque Pi_NeFB as a target value of the torque for ignition control. Meanwhile, the second selection section 3b selects one of the intake controlling demand torque Pi_EXT, acceleration demand torque Pi_APS and idle demand torque Pi_NeFE as a target value of the torque for intake control.

As a selection condition of a target value of the torque by the first selection section 3a and the second selection section 3b, for example, presence/absence of a demand for a torque from an external controlling system, a result of decision by an idle condition decision section 21 hereinafter described (whether or not idling of the engine 10 is required) or the like may be used. The torque value selected by the first selection section 3a is transmitted to the fuel cut section 3c, and the torque value selected by the second selection section 3b is transmitted to the intake delay correction section 3d.

The fuel cut section 3c sets the ignition controlling target torque Pi_TGT to zero when fuel cut control is to be executed. The carrying out condition of the fuel cut control is decided at any time, for example, based on the engine speed Ne, operation amount $\theta_{AC}$ of the acceleration pedal, engine cooling water temperature and so forth by a fuel cut controlling section not shown. Further, when the fuel cut control is not carried out, the fuel cut section 3c calculates the torque value selected by the first selection section 3a as it is as the ignition controlling target torque Pi_TGT. The ignition controlling target torque Pi_TGT calculated here is transmitted to the control section 4.

The intake delay correction section 3d carries out correction calculation in response to an intake delay of the air introduced into the cylinder of the engine 10 from the ETV 15. Here, a torque value is calculated taking an intake delay into consideration based on intake characteristics of the engine 10 and the ETV 15. It is to be noted that, as the correction calculation technique by the intake delay correction section 3d, various techniques can be applied in accordance with the controlling manner of the ETV 15. For example, the intake delay correction section 3d may carry out a first-order delay process and a second-order delay process simulating an actual intake delay for the torque value selected by the second selection section 3b to produce a locus of a torque variation to be implemented. The torque value calculated here is transmitted to the external load correction section 3e.

The external load correction section 3e adds the addition torque Pi_ADD to the inputted torque value to calculate the intake controlling target torque Pi_ETV_STD. In short, the torque of the magnitude corresponding to the external load is added here to the torque value for intake control. The intake controlling target torque Pi_ETV_STD calculated here is transmitted to the control section 4.

[2-3. Control Section]

As shown in FIG. 1, the control section 4 includes an ignition controlling section 4a (ignition timing detection unit) and an intake controlling section 4h (control unit). The ignition controlling section 4a carries out ignition control based on the ignition controlling target torque Pi_TGT, and the intake controlling section 4h carries out intake control based on the intake controlling target torque Pi_ETV_STD.

The intake controlling section 4h carries out intake control of adjusting the opening of the ETV 15 based on the intake controlling target torque Pi_ETV_STD. For example, the intake controlling section 4h calculates an air amount in the cylinder necessary to obtain the intake controlling target torque Pi_ETV_STD and controls the opening of the ETV 15 so that the air amount may be introduced into the cylinder of a target of the control.

As shown in FIG. 3, in the target torque calculation section 3, the addition torque Pi_ADD is used only in the calculation process of the intake controlling target torque Pi_ETV_STD but is not used in the calculation process of the ignition controlling target torque Pi_TGT. Accordingly, while the air amount to be introduced into the engine 10 is corrected in response to the external load, the ignition timing by the ignition plug 13 is controlled based on the ignition controlling target torque Pi_TGT to which such correction is not applied.

Figure 4:
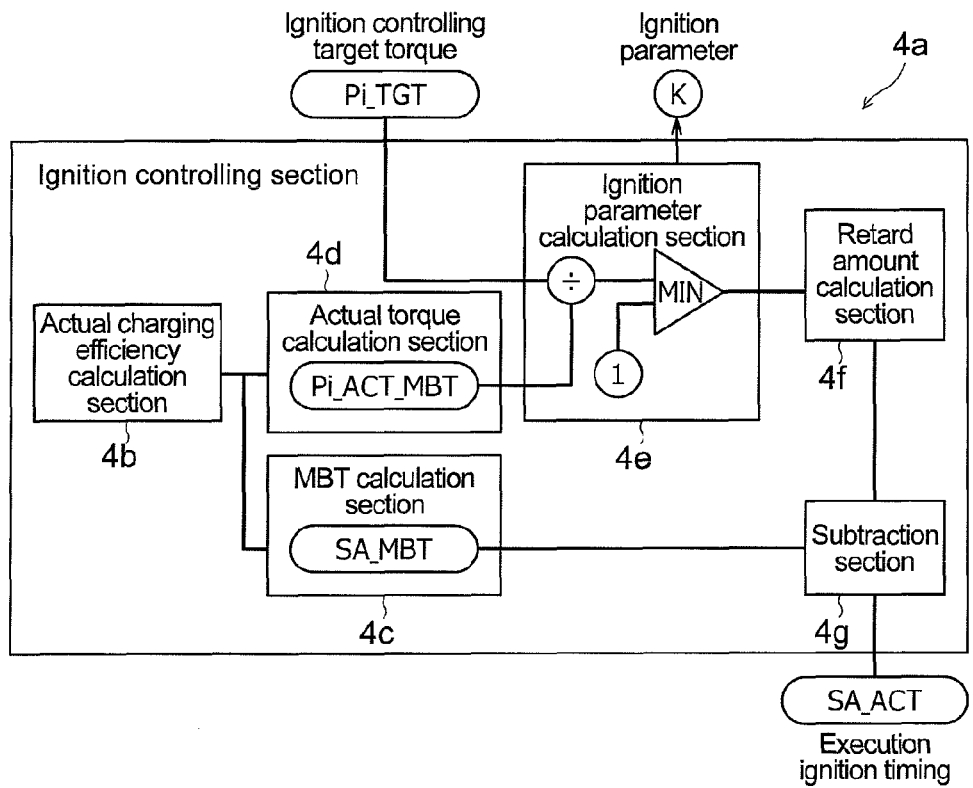
FIG. 4 is a block diagram illustrating a controlling process by an ignition controlling section of the controlling apparatus.

A calculation process by the ignition controlling section 4a is illustrated in FIG. 4. To the ignition controlling section 4a, the ignition controlling target torque Pi_TGT calculated by the target torque calculation section 3 and the intake flow rate Q and the engine speed Ne detected by the air flow sensor 7 are inputted. The ignition controlling section 4a includes an actual charging efficiency calculation section 4b, an MBT calculation section 4c, an actual torque calculation section 4d, an ignition parameter calculation section 4e, a retard amount calculation section 4f and a subtraction section 4g.

The actual charging efficiency calculation section 4b calculates an actual charging efficiency of the cylinder of a target of the control as the actual charging efficiency Ec based on the intake flow rate Q inputted thereto. Here, the amount of air actually taken into the cylinder of the control target is calculated from the total of the intake flow rate Q detected by the air flow sensor 7 within an immediately preceding intake stroke (one stroke in which the piston moves from the top dead center to the bottom dead center), and the actual charging efficiency Ec is calculated. The actual charging efficiency Ec calculated here is transmitted to the MBT calculation section 4c and the actual torque calculation section 4d.

Figure 5:
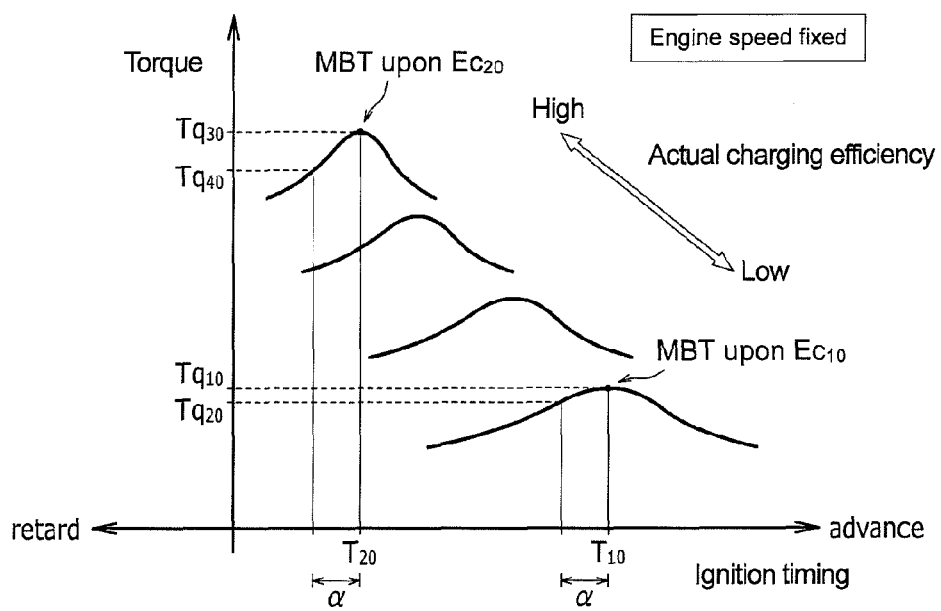
FIG. 5 is a view illustrating a correspondence map among an actual charging efficiency Ec, an ignition timing and a torque used in the controlling apparatus.

The MBT calculation section 4c calculates an ignition timing at which a maximum torque is generated (MBT, Minimum spark advance for Best Torque) as SA_MBT based on the actual charging efficiency Ec calculated by the actual charging efficiency calculation section 4b and the engine speed Ne. The MBT calculation section 4c, for example, as illustrated in FIG. 5, stores a correspondence relationship among the actual charging efficiency Ec, ignition timing and torque generated at a theoretical air fuel ratio as a map for each engine speed Ne, and uses the map to calculate an ignition timing SA_MBT. The ignition timing SA_MBT calculated here is transmitted to the subtraction section 4g. It is to be noted that, in the map of FIG. 5, the ignition timing SA_MBT when the actual charging efficiency Ec has a predetermined value $Ec_{10}$ is $T_{10}$ and the ignition timing SA_MBT when the actual charging efficiency Ec is another predetermined value $Ec_{20}$ is $T_{20}$.

The actual torque calculation section 4d calculates a maximum torque which can be generated by the cylinder of the control target at the actual charging efficiency Ec calculated by the actual charging efficiency calculation section 4b (that is, a torque generated when the ignition timing is set to the MBT at the actual charging efficiency Ec) as an actual torque Pi_ACT_MBT. The actual torque Pi_ACT_MBT here corresponds to a maximum value of the torque variation graph at each actual charging efficiency Ec illustrated in FIG. 5.

The actual torque calculation section 4d calculates the actual torque Pi_ACT_MBT, for example, using such a map stored in the MBT calculation section 4c as described above. In the graph of FIG. 5, the actual torque Pi_ACT_MBT when the actual charging efficiency Ec has the predetermined value $Ec_{10}$ is $Tq_{10}$, and the actual torque Pi_ACT_MBT when the actual charging efficiency Ec has the predetermined value $Ec_{20}$ is $Tq_{30}$. The actual torque Pi_ACT_MBT calculated here is transmitted to the ignition parameter calculation section 4e.

It is to be noted that the map of FIG. 5 represents the magnitude of torque, which is generated in the case where only the ignition timing is changed at the fixed actual charging efficiency Ec in the same combustion condition (for example, in the condition that the engine speed and the air fuel ratio are fixed), as a graph and indicates such graphs at different actual filling efficiencies Ec in an overlapping relationship with each other. At a fixed actual charging efficiency Ec, the torque on the axis of ordinate exhibits an upwardly convex curved line with respect to the variation of the ignition timing on the axis of abscissa. The ignition timing corresponding to the coordinate of the top of this graph is the MBT, and the torque corresponding to the coordinate of the top is the actual torque Pi_ACT_MBT. Further, if the actual charging efficiency Ec increases, then the torque increases and the combustion speed (flame propagation speed in the cylinder) rises due to increase of the amount of air introduced into the cylinder, and the MBT moves in the delay (lag) angle direction.

Here, the torque obtained when the ignition timing is retarded by a predetermined value a from the MBT in the case where the actual charging efficiency Ec is the predetermined value $Ec_{10}$ is represented by $Tq_{20}$ and the torque obtained when the ignition timing in the case where the actual charging efficiency Ec is the predetermined value $Ec_{20}$ is retarded by the predetermined value α from the MBT is represented by $Tq_{40}$. Thus, the torques satisfy a relationship of $(Tq_{20})/(Tq_{10})=(Tq_{40})/(Tq_{30})$ therebetween. The actual torque calculation section 4d calculates the actual torque Pi_ACT_MBT from the actual charging efficiency Ec using the map having such a characteristic as just described.

The ignition parameter calculation section 4e calculates a ratio K between the ignition controlling target torque Pi_TGT calculated by the target torque calculation section 3 and the actual torque Pi_ACT_MBT calculated by the actual torque calculation section 4d [K=(Pi_TGT)/(Pi_ACT_MBT), ignition parameter]. Here, it is calculated by what ratio the ignition controlling target torque Pi_TGT is demanded with respect to the magnitude of the torque which can be generated based on the intake flow rate Q actually detected by the air flow sensor 7. It is to be noted that, in the ignition parameter calculation section 4e in the present embodiment, the value of the ratio K is clipped within a range lower than 1 so that such an excessive torque as may exceed the actual torque Pi_ACT_MBT may not be generated by the ignition control. The ratio K calculated here is transmitted to the retard amount calculation section 4f and the addition torque calculation section 2d described above.

Figure 6:
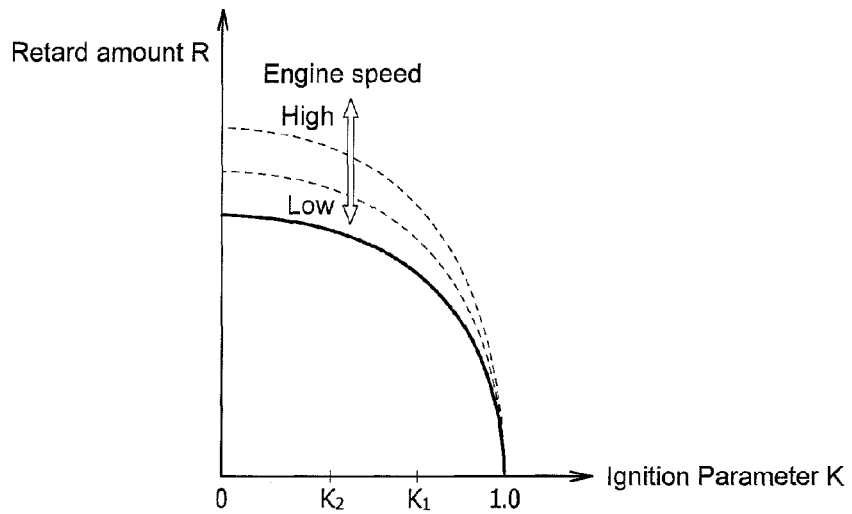
FIG. 6 is a view illustrating a correspondence map between an ignition parameter K and a retard amount R used in the controlling apparatus.

The retard amount calculation section 4f calculates a retard amount R (delay (lag) amount of the ignition timing) of a magnitude corresponding to the ratio K from MBT. The retard amount calculation section 4f stores a relationship between the ratio K and the retard amount R as a map for each engine speed Ne, for example, as illustrated in FIG. 6 and calculates the retard amount R using this map. It is to be noted that the retard amount R here is determined with reference to the MBT and has a characteristic that, as the ratio K (0≤K≤1) comes close to 1, the retard amount R comes close to zero. Further, the retard amount R has another characteristic that it increases as the engine speed Ne increases as indicated, for example, by a broken line in FIG. 6. The retard amount R calculated here is transmitted to the subtraction section 4g.

It is to be noted that the retard amount R is a value representative of a magnitude of a displacement of an ignition timing with reference to the MBT (a difference amount in time, displacement time period, or a shift amount of the phase of an angle corresponding to the displacement with respect to the rotational angle of the crankshaft). Further, as seen in FIG. 6, the retard amount R is defined uniquely corresponding to the value of the ratio K. Accordingly, also the ratio K is a value corresponding to the "displacement amount (spark advance angle amount or delay spark retard angle amount)" of the ignition timing with reference to the MBT. In the present embodiment, the ratio K calculated by the ignition parameter calculation section 4e is transmitted as a parameter corresponding to the actual ignition timing in the engine 10 to the addition torque calculation section 2d and used for calculation of the addition torque Pi_ADD.

The subtraction section 4g calculates an execution ignition timing SA_ACT based on the retard amount R calculated by the retard amount calculation section 4f. Here, for example, the retard amount R is subtracted from the ignition timing SA_MBT calculated by the MBT calculation section 4c to calculate the execution ignition timing SA_ACT. The execution ignition timing SA_ACT calculated here is an ignition timing with which a torque corresponding to the ignition controlling target torque Pi_TGT is to be generated.

The ignition controlling section 4a carries out ignition control of causing the ignition plug 13 provided in the cylinder of the control target to ignite at the execution ignition timing SA_ACT.

[2-4. Addition Torque Calculation Section]

Figure 7:
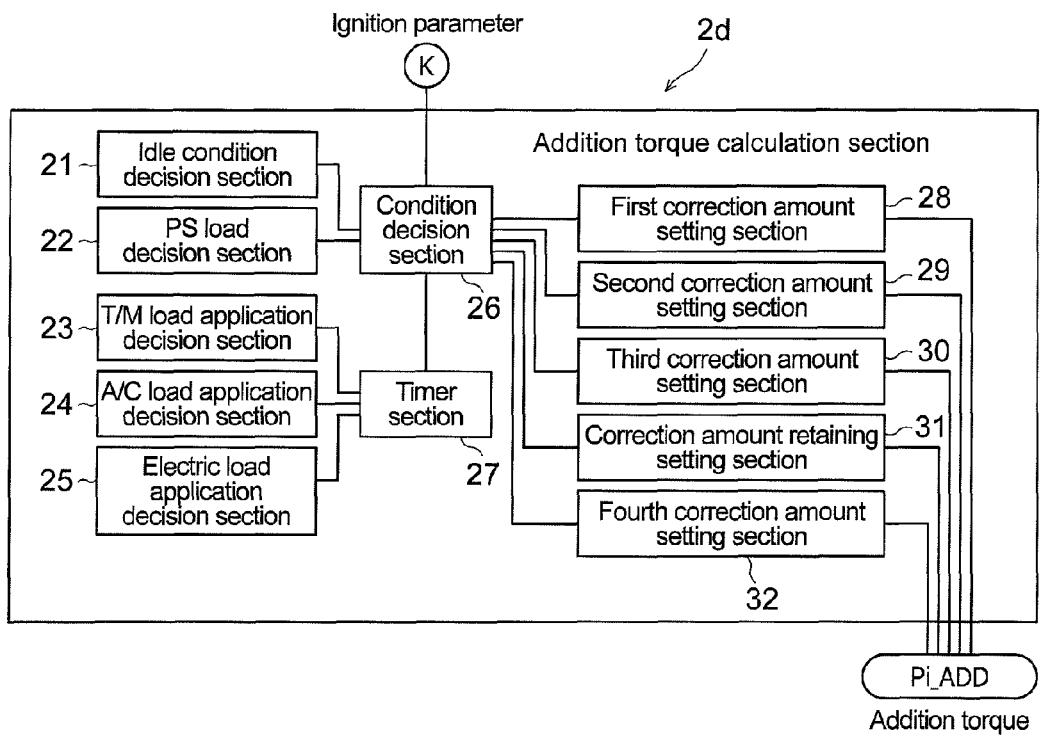
FIG. 7 is a block diagram illustrating a controlling process of an addition torque calculation section of the controlling apparatus.

A block configuration of the addition torque calculation section 2d is shown in FIG. 7. The addition torque calculation section 2d includes an idle condition decision section 21, a condition decision section 26, a timer section 27, and, as detection units for detecting a fluctuation of external loads, a P/S (Power assisted Steering) load decision section 22, a T/M (transmission) load application decision section 23, an A/C (Air Conditioning) load application decision section 24 and an electric load application decision section 25. The addition torque calculation section 2d further includes a first correction amount setting section 28, a second correction amount setting section 29, a third correction amount setting section 30, a correction amount retaining setting section 31 and a fourth correction amount setting section 32 which take part in correction calculation of the addition torque Pi_ADD.

To this addition torque calculation section 2d, the operation amount $\theta_{AC}$ detected by the acceleration pedal sensor 5, the operation angle θ_SAS detected by the steering angle sensor 8 and the vehicle speed V detected by the vehicle speed sensor 9 as well as an operation signal of an external load apparatus transmitted from an external controlling system and the ratio K calculated by the ignition parameter calculation section 4e are inputted. In the following description, the ratio K is referred to also as ignition parameter K.

The idle condition decision section 21 (idle detection unit) detects an idle state of the engine 10 based on the operation amount $\theta_{AC}$ of the acceleration pedal and the vehicle speed V. Here, the idle condition decision section 21 decides that, in the case where the vehicle speed V is lower than a predetermined speed V1 (for example, 10 [km/h]) and the treadling of the acceleration pedal is not detected (the operation amount $\theta_{AC}$ is equal to 0 or the operation amount $\theta_{AC}$ is smaller than a very small predetermined angle $\theta_{AC}$ the engine 10 is in an idle state. However, in any other case, the idle condition decision section 21 decides that the engine 10 is not in an idle state. The judgement condition of the idle state described is referred to as condition A.

The P/S load decision section 22 (detection unit) detects a fluctuation of an external load by the hydraulic power steering apparatus based on the operation angle θ_SAS. For example, in the case where the operation angle θ_SAS is greater than 0 [deg] (in other words, a P/S load exists), the P/S load decision section 22 decides that the external load relating to the steering operation may possibly fluctuate, but in the case where the operation angle θ_SAS is 0 [dg], the P/S load decision section 22 decides that the external load relating to the steering operation does not exhibit any fluctuation. A result of the decision here is transmitted to the condition decision section 26. Here, it is sufficient as long as it is possible to judge whether or not at least the steering wheel is at its neutral position. Accordingly, a sensor, a switch or the like for detecting presence or absence of steering of the steering wheel may be used in place of the steering angle sensor 8.

The T/M load application decision section 23 (detection unit) detects a fluctuation of an external load based on information regarding an operation state of the CVT apparatus transmitted from the CVT-ECU 16. Here, it is decided that, for example, in the case where the shift lever of the CVT apparatus is changed over from a non-running range to a running range, there is the possibility that the external load may fluctuate. It is to be noted that a configuration which uses, in place of information transmitted from the CVT-ECU 16, shift position information detected by a shift position sensor for detecting the operation position of the shift lever to carry out the decision described above may be adopted. A result of the decision here is transmitted to the timer section 27.

The A/C load application decision section 24 (detection unit) detects a fluctuation of an external load based on information regarding an operation state of the air conditioner transmitted from the air conditioner ECU 17. Here, for example, in the case where the main power supply to the air conditioner is operated from off to on, it is decided that there is the possibility that the external load may fluctuate. A result of the decision here is transmitted to the timer section 27. Similarly, the electric load application decision section 25 (detection unit) detects a fluctuation of an external load based in information regarding an operation state of various electric equipments, and in the case where a main switch of each of the various electric equipments is operated from off to on, it is decided that there is the possibility that the external load may fluctuate. Also a result of the decision here is transmitted to the timer section 27.

The timer section 27 starts counting of the timer in the case where a fluctuation of an external load is detected by any of the P/S load decision section 22, T/M load application decision section 23 and A/C load application decision section 24. The timer is a decrement type timing counting unit which decreases the value thereof as time passes and stops its counting when the value thereof becomes zero. The timer section 27 substitutes an initial value $T_{st}$ as a value T when a fluctuation of an external load is detected. Consequently, elapsed time (time corresponding to the initial value $T_{st}$) is measured after a fluctuation of the external load is detected.

The condition decision section 26 carries out a condition decision for outputting an addition torque Pi_ADD of a magnitude corresponding to a state of an external load inputted thereto and instructs the setting sections 28 to 32 described below of correction calculation of the addition torque Pi_ADD. Conditions decided here are successively listed below. The conditions 1 to 5 have higher priority in the ascending order of the condition number. For example, the condition 2 is decided in the case where the condition 1 is not satisfied, and the condition 3 is decided in the case where any of the condition 1 and the condition 2 is satisfied. Further, in the conditions 2 to 4, a first parameter $K_1$ (first reference value) and a second parameter $K_2$ (second reference value) are set as threshold values for the ignition parameter K. It is assumed that the relationship in magnitude of the threshold values is $0<K_2<K_1<1$ as seen in FIG. 6.

Condition 1: the condition A is satisfied and the value T of the timer is the initial value $T_{st}$.

Condition 2: the condition A is satisfied and the ignition parameter K is equal to or higher than the first parameter $K_1$ and besides a P/S load exists.

Condition 3: the condition A is satisfied and the ignition parameter K is equal to or higher than the first parameter $K_1$ and besides T>0.

Condition 4: the condition A is satisfied and the ignition parameter K is lower than the first parameter $K_1$ but is equal to or higher than the second parameter $K_2$ and besides a P/S load exists or the value T of the timer is T>0.

Condition 5: none of the conditions 1 to 4 described above is satisfied.

The condition decision section 26 instructs, when the condition 1 is satisfied, the first correction amount setting section 28 of correction calculation of the addition torque Pi_ADD. Similarly, in the case where the condition 2 is satisfied, the condition decision section 26 instructs the second correction amount setting section 29 of the calculation, but in the case where the condition 3 is satisfied, the condition decision section 26 instructs the third correction amount setting section 30 of the calculation. In the case where the condition 4 is satisfied, the condition decision section 26 instructs the correction amount retaining setting section 31 of the calculation, but in the case where the condition 5 is satisfied, the condition decision section 26 instructs the fourth correction amount setting section 32 of the calculation. The first correction amount setting section 28, second correction amount setting section 29 and third correction amount setting section 30 correct the addition torque Pi_ADD in the increasing direction, and the fourth correction amount setting section 32 corrects the addition torque Pi_ADD in the decreasing direction.

The first correction amount setting section 28 calculates a result of addition of the first correction amount to the addition torque Pi_ADD calculated in the preceding control cycle as the addition torque Pi_ADD in the present control cycle. The first correction amount is a torque addition amount immediately after an external load other than the P/S load (that is, at least one of the T/M load, A/C load and electric load) is inputted.

The second correction amount setting section 29 calculates a result of addition of the second correction amount to the addition torque Pi_ADD calculated in the preceding control cycle as the addition torque Pi_ADD in the present control cycle. The second correction amount corresponds to a torque amount which is normally added while the P/S load continues to be inputted.

The third correction amount setting section 30 calculates a result of addition of the third correction amount to the addition torque Pi_ADD calculated in the preceding control cycle as the addition torque Pi_ADD in the present control cycle. The third correction amount corresponds to a torque amount which is added only within a period of time after an external load other than the P/S load is inputted until a predetermined period of time elapses.

The correction amount retaining setting section 31 sets the addition torque Pi_ADD calculated in the preceding control cycle as it is to the addition torque Pi_ADD.

The fourth correction amount setting section 32 calculates a result of subtraction of the fourth correction amount from the addition torque Pi_ADD calculated in the preceding control cycle as the addition torque Pi_ADD in the present control cycle. However, the addition torque Pi_ADD is clipped to a value within a range equal to or higher than 0 (Pi_ADD≥0). It is to be noted that not only such a lower limit value but also an upper limit value may be set for the addition torque Pi_ADD. The addition torque Pi_ADD corrected and calculated by the first correction amount setting section 28, the second correction amount setting section 29, third correction amount setting section 30, correction amount retaining setting section 31 and fourth correction amount setting section 32 is transmitted to the target torque calculation section 3 and is used for calculation of the intake controlling target torque Pi_ETV_STD by the external load correction section 3e.

As described hereinabove, handling of the P/S load and handling of the other external loads in the calculation process of the addition torque Pi_ADD are distinguished from each other by the addition torque calculation section 2d. One of reasons is that the fluctuation amount of the P/S load is greater than that of the other loads.

Further, in the case of a shift lever operation of the CVT apparatus or an air conditioner operation, if a predetermined period of time elapses after the operation is inputted, then the load fluctuation becomes stable. In other words, the external load apparatus other than the hydraulic power steering apparatus has a tendency that the fluctuation is stabilized in response to lapse of time. In contrast, since operation of the power steering apparatus depends upon the operation amount of the driver, it is difficult to predict at which timing the P/S load changes suddenly. Also such a difference in characteristic is one of the reasons why handling of the P/S load and handling of the other external loads are distinguished from each other.

Further, it is signified that, as the ignition parameter K decreases toward zero (becomes lower), the retard amount increases, but as the ignition parameter K increases toward one (becomes higher), the ignition timing comes nearer to the MBT, that is, the retard amount decreases. In other words, as the ignition parameter K decreases, the torque reserve amount (a difference between a maximum torque which can be generated when ignition occurs at the MBT and an actually generated torque. This is a margin to the torque which can be increased by ignition control and is a parameter regarding by what degree the torque can be increased instantaneously) increases, but as the ignition parameter increases, the torque reserve amount decreases.

The conditions of the ignition parameter K included in the conditions 2 and 3 are regarded as conditions for deciding that the ignition state is that the torque reserve amount is comparatively small. Accordingly, when the condition 2 or 3 is satisfied, the addition torque Pi_ADD is corrected in the addition direction in order to increase the torque reserve amount. On the other hand, in the ignition state in which the ignition parameter K is low and the torque reserve amount is sufficiently great, the condition 5 is satisfied and the addition torque Pi_ADD is corrected in the decreasing direction.

[3. Flow Chart]

Figure 8:
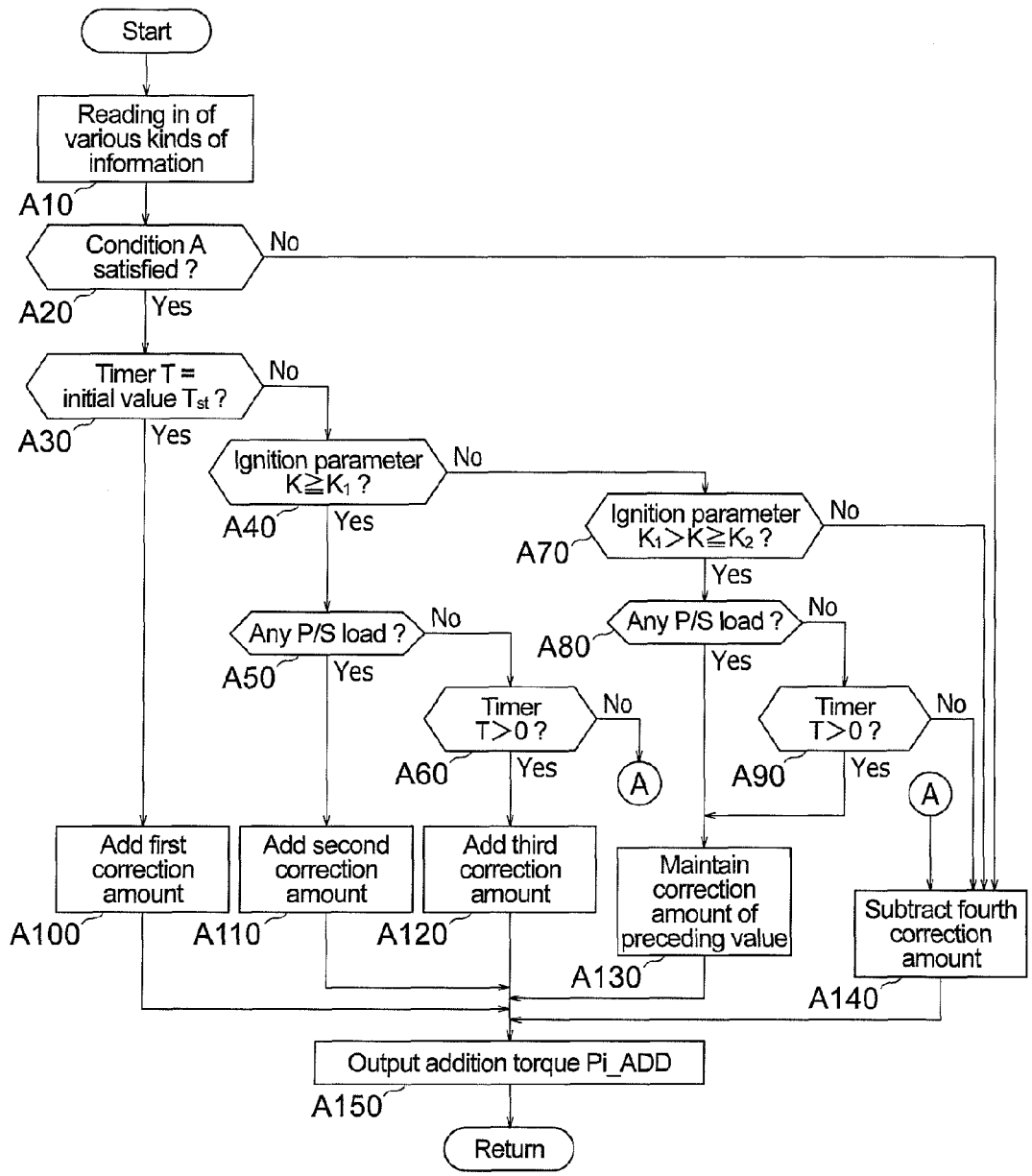
FIG. 8 is a flow chart illustrating control contents by the addition torque calculation section of the controlling apparatus.

A flow chart of FIG. 8 is illustrated as an example of a controlling procedure executed by the addition torque calculation section 2d. It is to be noted that decision conditions included in the flow chart are conditions obtained by decomposing the individual conditions included in the conditions 1 to 5 described hereinabove and reconstructing the conditions.

First at step A10, various kinds of information to be used for the condition decision are read in. Then at step A20, the idle condition decision section 21 decides based on the operation amount $\theta_{AC}$ of the acceleration pedal and the vehicle speed V whether or not the condition A is satisfied (whether or not the engine 10 is in an idle state). If the condition A is satisfied here, then the processing advances to step A30, but if the condition A is not satisfied, then since any of the conditions 1 to 4 is not satisfied, the processing advances to step A140 which corresponds to control when the condition 5 is satisfied. It is to be noted that, at step A140, the fourth correction amount is subtracted from the addition torque Pi_ADD calculated in the preceding control cycle by the fourth correction amount setting section 32, and then at step A150, the addition torque Pi_ADD after the subtraction is transmitted to the target torque calculation section 3.

At step A30, it is decided whether or not the value T of the timer of the timer section 27 is the initial value $T_{st}$. In other words, it is decided here whether nor not it is immediately after an external load other than the P/S load is inputted. If the value T of the timer here is $T=T_{st}$, then the processing advances to step A100 which corresponds to control when the condition 1 is satisfied. It is to be noted that, at step A100, the first correction amount is added to the addition torque Pi_ADD calculated in the preceding control cycle by the first correction amount setting section 28, and at step A150, the addition torque Pi_ADD after the addition is transmitted to the target torque calculation section 3.

On the other hand, if the value T of the timer is $T \neq T_{st}$ at step A30, the processing advances to step A40. At step A40, it is decided whether or not the ignition parameter K is equal to or higher than the first parameter $K_1$. If the ignition parameter K is $K \geq K_1$, then the processing advance to step A50, but if $K < K_1$, then the processing advances to step A70.

At step A50, presence/absence of a P/S load is decided, for example, based on the steering angle $\theta\_SAS$. If a P/S load exists, then the processing advances to step A110 which corresponds to control when the condition 2 is satisfied, but if a P/S load does not exist, then the processing advances to step A60. It is to be noted that, at step A110, the second correction amount is added to the addition torque Pi_ADD calculated in the preceding control cycle by the second correction amount setting section 29, and then at step A150, the addition torque Pi_ADD after the addition is transmitted to the target torque calculation section 3.

At step A60, it is decided whether or not the value T of the timer of the timer section 27 is higher than 0. In other words, it is decided whether or not the elapsed time after a fluctuation of the external load is detected is shorter than a predetermined period of time. Here, if the value T of the timer is T>0, then the processing advances to step A120 which corresponds to control when the condition 3 is satisfied, but if the value T of the timer is T=0, then the processing advances to step A140. It is to be noted that, at step A120, the third correction value is added to the addition torque Pi_ADD calculated in the preceding control cycle by the third correction amount setting section 30, and then at step A150, the addition torque Pi_ADD after the addition is transmitted to the target torque calculation section 3.

At step A70, it is decided whether or not the ignition parameter K is lower than the first parameter $K_1$ but is equal to or higher than the second parameter $K_2$. If the following inequality $K_1 > K \geq K_2$ is satisfied, then the processing advances to step A80, but if $K < K_2$, then the processing advances to step A140.

At step A80, presence/absence of a P/S load is decided similarly as at step A50. If a P/S load exists, then the processing advances to step A130 which corresponds to control when the condition 4 is satisfied. On the other hand, if a P/S load does not exist, then the processing advances to step A90, at which it is decided whether or not the value T of the timer of the timer section 27 is higher than 0 similarly as at step S60. If the value T of the timer is T>0 here, then the processing advances to step A130 which corresponds to control when the condition 4 is satisfied. On the other hand, if the value T of the timer is T=0, then the processing advances to step A140.

At step A130, the addition torque Pi_ADD calculated in the preceding control cycle is set as it is to the addition torque Pi_ADD in the present control cycle by the correction amount retaining setting section 31, and then at step A150, the addition torque Pi_ADD is transmitted to the target torque calculation section 3.

It is to be noted that the condition decision at step A20 of the present flow chart is a condition decision for selecting a route for the fourth correction amount (step A140) or a route for any other correction amount (steps A100 to A130). In short, in the present control, the correction amount is increased or decreased depending upon whether or not the engine is in an idle state.

Further, the condition decisions regarding the ignition parameter K at steps A40 and A70 of the present flow chart are one of condition decisions for selecting a route to one of the steps A100 to A140. In other words, the correction amount is increased or decreased according to the displacement amount from the reference value (the first parameter $K_1$ or the second parameter $K_2$) of the ignition timing.

Additionally, the condition decision relating to P/S load at steps A50 and A80 of the present flow chart is also one of the condition decisions for selecting a route to any of steps A110 to A140. In short, the correction amount is increased or decreased based on the presence/absence of the P/S load.

Furthermore, the condition decision relating to the timer T at steps A30, A60, and A90 of the present flow chart is one of the condition decisions for selecting a route to any of steps A100 to A150. In short, the correction here is increased or decreased based on the elapsed time after an external load other than the hydraulic power steering apparatus is inputted.

[4. Action]

[4-1. Upon Turning on Operation of the Air Conditioner]

Figure 9:
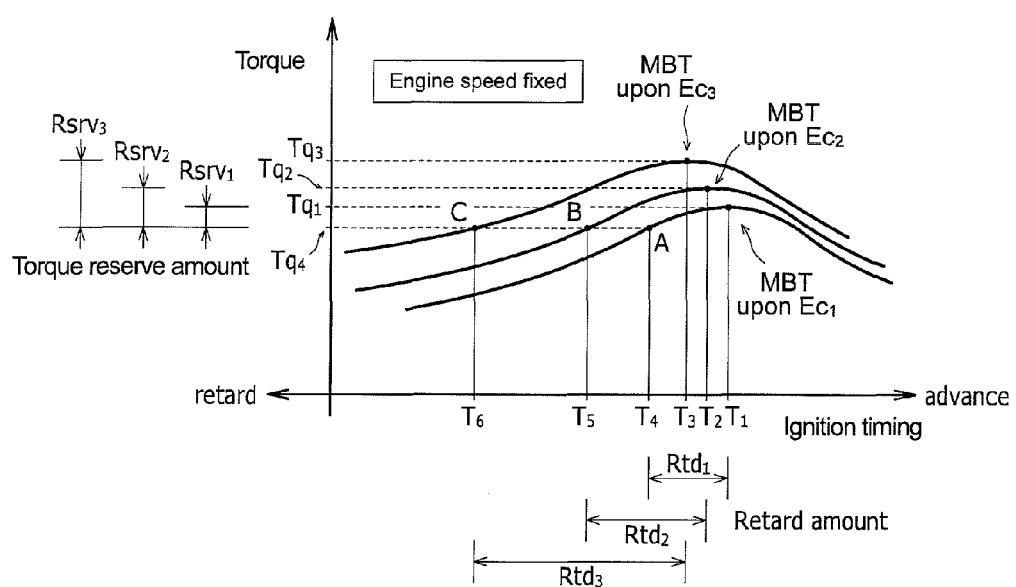
FIG. 9 is a graph illustrating a controlling action of the controlling apparatus.

A variation of the torque behavior when the addition torque Pi_ADD increases by the control described above is described. As seen in FIG. 9, when the engine 10 is in an idle state and the actual charging efficiency Ec is a first predetermined value $Ec_1$ while the ignition controlling target torque Pi_TGT is $Tq_4$, the ignition timing is set to $T_4$ corresponding to the point A.

In the control state at the point A, the ignition timing is moved in the delaying direction from $T_1$ which is the MBT when the actual charging efficiency Ec is the first predetermined value $Ec_1$, and a retard amount $Rtd_1$ is $T_1-T_4$. Further, a torque reserve amount $Rsrv_1$ at the point A is $Tq_1-Tq_4$, which is a difference of the torque at the point A from the torque at the MBT.

If the main power supply to the air conditioner is operated into an on state from an off state, then information regarding the working state of the air conditioner is transmitted from the air conditioner ECU 17 to the demand torque calculation section 2 of the engine ECU 1. Upon reception of this information, the idle demand torque setting section 2a calculates an idle demand torque Pi_NeFB including an external load demand torque Pi_AUX. Meanwhile, the acceleration demand torque calculation section 2b calculates an acceleration demand torque Pi_APS including an external load demand torque Pi_AUX, and based on this, the final demand torque calculation section 2c calculates an ignition controlling demand torque Pi_EXT_SA and an intake controlling demand torque Pi_EXT.

Meanwhile, the A/C load application decision section 24 of the addition torque calculation section 2d decides from the information regarding the working state of the air conditioner that there is the possibility that an external load may fluctuate. Receiving the possibility, the timer section 27 substitutes the initial value $T_{st}$ as the value T of the timer and starts counting down of the timer. This value T of the timer is transmitted to the condition decision section 26. At this time, since the condition 1 is satisfied in the condition decision section 26, the first correction amount setting section 28 adds the first correction amount to the addition torque Pi_ADD calculated in the preceding control cycle. Then, the value after the addition is transmitted as the addition torque Pi_ADD in the present control cycle to the target torque calculation section 3.

In the case where the engine 10 is in an idle state, the second selection section 3b of the target torque calculation section 3 selects, from among the intake controlling demand torque Pi_EXT, acceleration demand torque Pi_APS and idle demand torque Pi_NeFB, the idle demand torque Pi_NeFB as a target value for the torque for intake control. To the idle demand torque Pi_NeFB selected here, correction calculation is applied by the intake delay correction section 3d, and the addition torque Pi_ADD is added after the correction calculation by the external load correction section 3e.

Consequently, the intake controlling target torque Pi_ETV_STD calculated by the target torque calculation section 3 increases, and the intake controlling section 4h of the control section 4 controls the opening of the ETV 15 so that the amount of air to be introduced into the cylinder increases at a time. Further, the intake flow rate Q increases together with this and also the actual charging efficiency Ec increases. As seen in FIG. 9, the actual charging efficiency at this time is set to a second predetermined value $Ec_2$.

In contrast, in the calculation process of the ignition controlling target torque Pi_TGT by the target torque calculation section 3, the addition torque Pi_ADD is not added. In other words, even if the addition torque Pi_ADD increases, the ignition controlling target torque Pi_TGT does not change from $Tq_4$. Accordingly, as seen in FIG. 9, the ignition timing is set to $T_5$ so as to correspond to a point B. The retard amount $Rtd_2$ at the point B is $T_2$-$T_5$, and the torque reserve amount $Rsrv_2$ is $Tq_2$-$Tq_4$.

As described above, since the torque to be generated by the engine 10 increases as the actual charging efficiency Ec increases, the torque value $Tq_2$ is higher than $Tq_1$. Accordingly, the torque reserve amount $Rsrv_2$ is greater than the torque reserve amount $Rsrv_1$, and the margin of the torque increases by the increase of the addition torque Pi_ADD. On the other hand, since the ignition controlling target torque Pi_TGT does not change from $Tq_3$, the magnitude of the torque actually outputted from the engine 10 does not vary, and only the torque reserve amount increases. Accordingly, upon starting of the air conditioner, no torque shock occurs.

In the next calculation cycle by the addition torque calculation section 2d, since the value T of the timer comes to a state decreased from the initial value $T_{st}$, the condition 1 is not satisfied. Meanwhile, within a period after the main power supply to the air conditioner is operated into an on state until a predetermined period of time elapses, or in other words, in the case where the value T of the timer is T>0, if the ignition parameter K is equal to or higher than the first parameter $K_1$, then the condition 3 is satisfied. Accordingly, the third correction amount setting section 30 adds the third correction amount to the addition torque Pi_ADD calculated in the preceding control cycle, and the value after the addition is transmitted as the addition torque Pi_ADD in the present control cycle to the target torque calculation section 3.

The ignition parameter K is, for example, in the control state at the point B, K=$Tq_4$/$Tq_2$ because it is a ratio [K=(Pi_TGT)/(Pi_ACT_MBT)] between the ignition controlling target torque Pi_TGT calculated by the target torque calculation section 3 and the actual torque Pi_ACT_MBT calculated by the actual torque calculation section 4d. This value is equal to or higher than the first parameter $K_1$ when the ignition timing is comparatively close to the MBT, that is, in an ignition state in which the torque reserve amount is comparatively small.

When the third correction amount is added to the addition torque Pi_ADD, the intake controlling target torque Pi_ETV_STD calculated by the target torque calculation section 3 further increases, and the intake controlling section 4h of the control section 4 controls the opening of the ETV 15 so that the amount of air to be introduced into the cylinder is further increased. At this time, since the ignition controlling target torque Pi_TGT does not vary from $Tq_4$, the control state moves in a direction toward the point C. By such control, the torque reserve amount further increases. The torque reserve amount $Rsrv_3$ at this time is $Tq_3$-$Tq_4$, which is further greater than the torque reserve amount $Rsrv_2$.

Before the predetermined period of time elapses after the main power supply to the air conditioner is operated into an on state, the control state at the point C is reached, and if the ignition parameter K=$Tq_4$/$Tq_3$ at this point C becomes lower than $K_1$ (although it is higher than $K_2$), the condition 4 is satisfied. Consequently, the addition torque Pi_ADD calculated in the preceding control cycle by the correction amount retaining setting section 31 is transmitted as it is as the addition torque Pi_ADD in the present control cycle to the target torque calculation section 3. Accordingly, the control state is maintained at the position of the point C, and also the torque reserve amount $Rsrv_3$ is maintained As $Tq_3$-$Tq_4$.

When the predetermined period of time elapses after the main power supply to the air conditioner is operated into an on state, the value T of the timer becomes zero. Consequently, unless the P/S load exists, the condition 4 becomes unsatisfied and the condition 5 is satisfied simultaneously. Consequently, the fourth correction amount is subtracted from the addition torque Pi_ADD calculated in the preceding control cycle by the fourth correction amount setting section 32, and the value after the subtraction is transmitted as the addition torque Pi_ADD in the present control cycle to the target torque calculation section 3. At this time, since the ignition controlling target torque Pi_TGT does not vary from $Tq_4$, the control state moves in a direction toward the point B. Further, if such subtraction is repeated, then the value of the addition torque Pi_ADD finally becomes zero and the control state at the point A is reached.

It is to be noted that, even if the predetermined period of time does not elapse after the main power supply to the air conditioner is operated into an on state, if the ignition timing is delayed until the ignition parameter K becomes lower than $K_2$, then unless the P/S load exists, the condition 4 becomes unsatisfied and the condition 5 is satisfied simultaneously. Accordingly, the opening of the ETV 15 is controlled so that, when the addition torque Pi_ADD is corrected so as to decrease, the amount of air to be introduced into the cylinder is decreased.

In this manner, in the case where the main power supply to the air conditioner is operated into an on state from an off state, the first correction amount is added in the calculation of the addition torque Pi_ADD immediately after the turning on operation is carried out, and for a period of time until the predetermined period of time elapses thereafter, the third correction amount is added to the addition torque Pi_ADD in response to the condition of the ignition parameter K. Further, in the case where the delay (lag) angle amount of the ignition timing increases until the torque reserve amount is assured sufficiently or in the case where the predetermined period of time elapses, the fourth correction amount is subtracted from the addition torque Pi_ADD.

The control described above is carried out not only in the case where the main power supply to the air conditioner is operated into an on state from an off state but also in the case where the shift lever of the CVT apparatus is changed over from the non-running range to the running range or in the case where the main switch to various electric equipments is operated into an on state from an off state.

[4-2. Upon Steering Operation]

Meanwhile, if a steering operation is inputted upon an idle operation of the engine 10, then control different from that in the case of an operation of the air conditioner is carried out.

For example, if a steering operation is inputted, then an operation angle θ_SAS is transmitted from the steering angle sensor 8 to the demand torque calculation section 2 of the engine ECU 1. An idle demand torque Pi_NeFB including an external load demand torque Pi_AUX is calculated by the idle demand torque setting section 2a, and this idle demand torque Pi_NeFB is transmitted to the target torque calculation section 3. It is to be noted that also an acceleration demand torque Pi_APS, an ignition controlling demand torque Pi_EXT_SA and an intake controlling demand torque Pi_EXT are calculated similarly as in the case where the air conditioner is operated.

Further, the P/S load decision section 22 of the addition torque calculation section 2d decides from the information of the operation angle θ_SAS that there is the possibility that the external load may fluctuate. At this time, if the ignition parameter K is equal to or higher than the first parameter $K_1$, then the condition 2 is satisfied during the steering operation. Accordingly, the second correction amount is added to the addition torque Pi_ADD calculated in the preceding control cycle by the second correction amount setting section 29, and the value after the addition is transmitted as the addition torque Pi_ADD in the present control cycle to the target torque calculation section 3.

Accordingly, the intake controlling target torque Pi_ETV_STD calculated by the target torque calculation section 3 increases by the addition torque Pi_ADD, and the intake controlling section 4h of the control section 4 controls the opening of the ETV 15 so that the amount of air to be introduced into the cylinder may increase at a time. Further, the intake flow rate Q increases together with this, and also the actual charging efficiency Ec increases up to the second predetermined value $Ec_2$.

On the other hand, since the ignition controlling target torque Pi_TGT by the target torque calculation section 3 does not vary from $Tq_4$, the ignition timing is set to $T_5$ which corresponds to the point B. The retard amount $Rtd_2$ at the point B is $T_2$-$T_5$, and the torque reserve amount $Rsrv_2$ is $Tq_2$-$Tq_4$. In short, by the increase of the addition torque Pi_ADD, the margin of the torque to be outputted from the engine 10 increases. Meanwhile, since the ignition controlling target torque Pi_TGT does not vary from $Tq_3$, the magnitude of the torque actually outputted from the engine 10 does not vary while only the torque reserve amount increases. Accordingly, no torque shock occurs upon steering operation.

Since there is no restriction in time to the increasing correction of the addition torque Pi_ADD by the second correction amount setting section 29, it is always continued during inputting of the steering operation. Consequently, the control state moves in a direction toward the point C. For example, if the ignition parameter $K=Tq_4/Tq_3$ becomes lower than $K_1$ (but is equal to or higher than $K_2$) in the control state at the point C, then the condition 4 is satisfied. Consequently, the addition torque Pi_ADD is maintained by the correction amount retaining setting section 31, and the control state is maintained at the position of the point C.

Or, in the case where the ignition timing is delayed until the ignition parameter K becomes lower than $K_2$, the condition 4 becomes unsatisfied and the condition 5 is satisfied simultaneously. Accordingly, the opening of the ETV 15 is controlled so that, as the addition torque Pi_ADD is corrected so as to decrease, the amount of air to be introduced into the cylinder decreases.

Further, if the operation position of the steering wheel is returned to its neutral position, then the P/S load decision section 22 decides that there is no possibility that the external load relating to the steering operation may fluctuate, and the condition 5 is satisfied. Also in this instance, the addition torque Pi_ADD is corrected so as to decrease, and the opening of the ETV 15 is controlled so that the intake air amount may decrease.

[5. Effect]

In this manner, with the controlling apparatus described above, since the addition torque Pi_ADD of a plurality of patterns is set in response to a state of external loads and the mount of air to be introduced into the engine 10 is controlled based on the set addition torque Pi_ADD, various torque-based controls taking a fluctuation of an external load into consideration can be implemented. Consequently, the stability of the operation state of the engine 10 can be enhanced and the fuel cost can be improved.

Further, with the controlling apparatus described above, the addition torque Pi_ADD is corrected so as to increase only when it is decided by the condition decision section 26 that one of the conditions 1 to 3 is satisfied and only in the case where a fluctuation of an external load is detected. Therefore, such a situation that the addition torque Pi_ADD becomes excessively high can be prevented, and the fuel cost can be improved.

Further, with the controlling apparatus described above, the value of the addition torque Pi_ADD is set in response to an operation state of the main power supply switch of the air conditioner, the shift lever of the CVT apparatus and a main switch of various electric equipments. In other words, since a fluctuation of an external load is detected based on a working state of an external load apparatus, the timing at which the margin of the torque is to be corrected so as to increase can be decided readily and accurately and besides the stability of the operation state of the engine 10 can be improved while the fuel cost can be improved.

In this manner, the stability can be improved only in a state in which the engine 10 is liable to become unstable. Further, in a state in which the engine 10 is less likely to become unstable, the air amount can be reduced by reducing the value of the addition torque Pi_ADD (for example, to zero), and the fuel cost can be improved.

Further, with the controlling apparatus described above, not only the addition torque Pi_ADD is corrected so as to increase in response to a fluctuation of an external load, but also the value of the addition torque Pi_ADD is corrected in response to the ignition timing. Therefore, while such a situation that the target torque is set to an excessively high value is prevented, an appropriate target torque can be set. Also in this regard, the stability of the operation state of the engine 10 can be improved, and the fuel cost can be improved.

Further, in regard to the association between the correction technique of the addition torque Pi_ADD and the ignition timing, the controlling apparatus described above corrects the addition torque Pi_ADD, in the case where the ignition parameter K is equal to or higher than $K_1$, so as to increase, but corrects the addition torque Pi_ADD, in the case where the ignition parameter K is lower than $K_2$, so as to decrease as seen in FIG. 6. In short, as a timing at which the addition torque Pi_ADD is to be corrected so as to increase, a case in which the torque reserve amount is small is selected, but when the torque reserve amount is assured sufficiently, the addition torque Pi_ADD is corrected so as to decrease, thereby to achieve appropriation of the torque reserve amount.

In this manner, in the case where the ignition timing is rather advancing, the torque reserve amount can be increased by increasing the addition torque Pi_ADD, and the stability of the operation state of the engine 10 can be further improved.

On the other hand, in the case where the ignition timing is rather delaying, the torque reserve amount can be decreased by decreasing the addition torque Pi_ADD, and the fuel cost can be further improved.

Further, in the case where the ignition parameter K is lower than the first parameter $K_1$ but is equal to or higher than the second parameter $K_2$, since the value of the addition torque Pi_ADD is maintained as it is, the torque reserve amount can be converged into a fixed range, and a state in which the stability and the fuel cost of the engine 10 are balanced well can be maintained.

It is to be noted that also it is imaginable to increase the intake controlling target torque Pi_ETV_STD and simultaneously increase also the ignition controlling target torque Pi_TGT so that the ignition timing is not retarded. However, in this instance, the torque reserve amount is decreased. On the other hand, the retarding of the ignition timing in the controlling apparatus of the present embodiment is carried out simultaneously with the control of increasing the intake amount, and the increment of the torque by the increase of the actual charging efficiency Ec is canceled by the retarding of the ignition timing. Accordingly, the torque reserve amount can be increased without varying the actual output torque of the engine 10, and the stability against the load fluctuation can be improved.

Further, the controlling apparatus of the present embodiment includes the calculation processor which reflects, when the control of increasing the intake amount simultaneously with retarding of the ignition timing is carried out, the addition torque Pi_ADD only on the calculation of the intake controlling target torque Pi_ETV_STD but does not reflect the addition torque Pi_ADD on the calculation of the ignition controlling target torque Pi_TGT. By increasing only the intake controlling target torque Pi_ETV_STD in this manner, the maximum torque obtained at the MBT can be increased with certainty. In short, the torque reserve amount can be increased with certainty without allowing fluctuation of the actual output torque of the engine 10, and the robustness of the control can be improved.

The controlling apparatus described above further includes a configuration for increasing the addition torque Pi_ADD when the engine 10 is in an idle state in which the operation state of the engine 10 is liable to be influenced by the fluctuation of an external load (liable to become unstable). Accordingly, the stability of the engine 10 can be enhanced effectively.

It is to be noted that, when the engine 10 is not in an idle state, since the conditions 1 to 4 described hereinabove are not satisfied while the condition 5 is satisfied, the addition torque Pi_ADD is corrected so as to decrease and finally becomes equal to zero. By decreasing the addition torque Pi_ADD when the engine 10 is not in an idle state or when a variation of an external load is not detected in this manner, excessive increase of the air amount can be suppressed and the fuel cost can be improved effectively.

Further, as regards the correction technique of the addition torque Pi_ADD, the controlling apparatus described above can set torques of different magnitudes depending upon the kind of an external load apparatus. For example, for a steering operation, correction based on the second correction amount can be carried out while correction based on the third correction amount can be carried out for an operation of the air conditioner, CVT apparatus or various electric equipments. Accordingly, an addition torque Pi_ADD of an appropriate magnitude suitable for the kind of the external load apparatus can be calculated, and the fuel cost can be improved while the stability of the operation state of the engine 10 is improved. Particularly since the hydraulic power steering apparatus exhibits a great load fluctuation among the external load apparatus, the addition torque Pi_ADD is always increased during an operation of the hydraulic power steering apparatus so that it becomes a help to enhancement of the stability of the operation state of the engine.

Further, in the controlling apparatus described above, the correction technique of the value of the addition torque Pi_ADD is changed based on time elapsed after a fluctuation of an external load is detected. Consequently, an addition torque Pi_ADD of an appropriate magnitude can be calculated for an external load apparatus whose load fluctuation becomes stabilized, for example, when a predetermined period of time elapses, except the hydraulic power steering apparatus. Consequently, the fuel cost can be improved further while the stability of the operation state of the engine 10 is enhanced.

[6. Modifications, Etc.]

The present invention can be carried out in various modified forms without departing from the spirit and scope thereof irrespective of the embodiments thereof described hereinabove. The configurations of the present embodiment can be selectively used or removed as occasion demands or can be combined suitably.

While, in the embodiment described above, the engine ECU 1 includes the functions of the demand torque calculation section 2, target torque calculation section 3 and control section 4, the particular controlling configuration of the engine ECU 1 is not limited to this. The technical effects described hereinabove are exhibited with an electronic controlling apparatus if it includes at least a configuration for correcting a demand torque (for example, the external load demand torque Pi_AUX) demanded by an external load in response to a state of the external load (for example, adding the addition torque Pi_ADD to correct the demand torque), a configuration for setting a target torque for the engine 10 in response to the demand torque after the correction, and a configuration for controlling the amount of air so that the target torque may be outputted from the engine ECU 1. Accordingly, it is possible to suitably add or simplify a particular controlling configuration.

Further, while the torque-based control of the engine 10 in the embodiment described hereinabove concurrently calculates two kinds of target torques including the ignition controlling target torque Pi_TGT for ignition control and the intake controlling target torque Pi_ETV_STD for intake control, the torque-based control may calculate at least the intake controlling target torque Pi_ETV_STD for intake control.

Further, the particular contents of the conditions 1 to 5 in the embodiment described above can be set arbitrarily, and also it is possible to adopt an additional correction condition. By adopting an additional condition, more accurate and smooth control can be achieved, and the stability of the engine 10 can be enhanced further. Further, useless increase of the torque reserve amount can prevented and the fuel cost can be further improved.

Further, while the ratio between the ignition controlling target torque Pi_TGT and the actual torque Pi_ACT_MBT in the embodiment described hereinabove is decided as the ignition parameter K in the conditions 2 to 4, the calculation technique of the ignition parameter K is not limited to this. For example, the degree of an angle of delay (retard) or an angle of lead (advance) may be grasped based on the difference between the ignition controlling target torque Pi_TGT and the actual torque Pi_ACT_MBT. In particular, if a calculation method which focuses on a correlation between the degree of the difference between the ignition controlling target torque Pi_TGT and the actual torque Pi_ACT_MBT and the degree of an angle of lead or an angle of delay (lag) of the ignition timing is used, then it is possible to grasp an ignition timing necessary to assure an appropriate torque reserve amount, and the technical effects described hereinabove can be achieved.

Further, if attention is paid to the relationship between the ignition parameter K and the correction amount of the addition torque Pi_ADD in the controls of the embodiment described hereinabove, for example, not only in the case where the ignition parameter K is displaced even a little to the angle of lead from the first parameter $K_1$, but also in the case where the ignition parameter K is displaced by a great amount to the angle of lead from the first parameter $K_1$, the correction amount itself does not vary. On the other hand, also it is imaginable to correct the addition torque Pi_ADD so as to increase or decrease in response to an amount of an angle of lead or an angle of delay (displacement amount) from the first parameter $K_1$ and/or the second parameter $K_2$ of the ignition parameter K in place of or in addition to such control as described above. For example, a configuration wherein the first to fourth correction values are multiplied by a coefficient which is set in response to an amount of an angle of lead or an angle of delay (displacement amount) from the first parameter $K_1$ and/or the second parameter $K_2$ of the ignition parameter K may be adopted. Or, another configuration wherein a predetermined correction value set in advance in response to the displacement amount described above is added to the first to fourth correction values may be adopted.

In those cases, the torque reserve amount can be increased and the stability of the operation state of the engine can be further enhanced, for example, by increasing the addition torque Pi_ADD as the lead angle amount increases or as the delay (lag) angle amount decreases. Further, the torque reserve amount can be decreased and the fuel cost can be further improved, for example, by decreasing the addition torque Pi_ADD as the lead angle amount decreases or as the delay (lag) angle amount increases. The torque reserve amount has a characteristic that it exhibits a minimum value when the ignition timing is the MBT and increases as the displacement amount from the MBT increases. Accordingly, the relationship between the displacement amount and the increasing or decreasing amount of the correct value can be set in various manners in response to such a characteristic as just described and a torque reserve amount to be assured.

It is to be noted that the combustion type of the engine 10 in the embodiment described above can be set arbitrarily. The present invention can be applied at least to general engines for which torque-based control is carried out and can be applied also to a lean burn engine, an engine having a variable valve lift mechanism and so forth.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

REFERENCE SIGNS LIST 1 engine ECU (engine electronic controlling apparatus)
2 demand torque calculation section (setting unit)
2a idle demand torque setting section
2b acceleration demand torque calculation section (first calculation unit)
2c final demand torque calculation section (second calculation unit)
2d addition torque calculation section
3 target torque calculation section (target torque calculation unit)
4 control section
4a ignition controlling section (ignition timing detection unit)
4h intake controlling section (control unit)
5 acceleration pedal sensor (acceleration operation amount detection unit)
6 crank angle sensor (engine speed detection unit)
8 steering angle sensor (steering angle detection unit)
9 vehicle speed sensor 9 (vehicle speed detection unit)
10 engine
21 idle condition decision section (idle detection unit)
22 PS load decision section (detection unit)
23 T/M load application decision section (detection unit)
24 A/C load application decision section (detection unit)
25 electric load application decision section (detection unit)
26 condition decision section
27 timer section
28 first correction amount setting section (correction unit)
29 second correction amount setting section (correction unit)
30 third correction amount setting section (correction unit)
31 correction amount retaining setting section (correction unit)
32 fourth correction amount setting section (correction unit)

What is claimed is:

1. An engine controlling apparatus, comprising:
a setting unit that sets a demand torque to an engine mounted on a vehicle;
a detection unit that detects, based on a working state of an external load apparatus which applies an external load to the engine, a fluctuation of the external load;
a correction unit that corrects the demand torque set by said setting unit in response to a result of the detection by said detection unit;

a target torque calculation unit that calculates a target torque for the engine based on the demand torque corrected by said correction unit;

a control unit that controls an amount of air to be introduced into the engine so that an output torque of the engine may come close to the target torque calculated by said target torque calculation unit; and an ignition timing detection unit that detects an ignition timing of said engine; wherein said correction unit adds, when a fluctuation of the external load is detected by said detection unit, a torque increment for coping with the fluctuation to the demand torque set by said setting unit to determine an increment correction demand torque and increases or decreases the increment correction demand torque in response to a displacement amount of the ignition timing detected by said ignition timing detection unit from a predetermined reference value.

2. The engine controlling apparatus according to claim 1, wherein a first reference value is set as the predetermined reference value, and said correction unit increases the increment correction demand torque in response to a displacement amount of the ignition timing detected by said ignition timing detection unit in a direction to advance the ignition from the first reference value.

3. The engine controlling apparatus according to claim 2, wherein a second reference value displaced in a direction to retard the ignition from the first reference value is set as the predetermined reference value, and said correction unit decreases the increment correction demand torque in response to the displacement amount of the ignition timing detected by said ignition timing detection unit in a direction to retard the ignition from the second reference value.

4. The engine controlling apparatus according to claim 3, wherein said correction unit maintains the increment correction demand torque when the ignition timing detected by said ignition timing detection unit remains in a range between the first reference value and the second reference value.

5. The engine controlling apparatus according to claim 1, wherein said control unit increases the amount of air to be introduced into the engine and retards the ignition timing to cancel the increment correction demand torque.

6. The engine controlling apparatus according to claim 5, further comprising:

a first calculation unit that calculates an acceleration demand torque demanded by a driver of the vehicle; and a second calculation unit that calculates a first target torque for ignition timing control and a second target torque for intake amount control based on the acceleration demand torque calculated by said first calculation unit; wherein said target torque calculation unit adds the demand torque to the second target torque calculated by said second calculation unit to calculate the target torque.

7. The engine controlling apparatus according to claim 1, further comprising:

an idle detection unit that detects whether or not the engine is in an idle state; wherein said correction unit increases the demand torque if the idle state is detected by said idle detection unit and the fluctuation is detected by said detection unit.

8. The engine controlling apparatus according to claim 7, wherein said correction unit decreases the demand torque if the idle state is not detected by said idle detection unit or the fluctuation is not detected by said detection unit.

9. The engine controlling apparatus according to claim 1, wherein, in the case where said correction unit corrects the demand torque in response to a kind of the external load apparatus and the external load apparatus is a hydraulic power steering apparatus mounted on the vehicle, said correction unit increases or decreases the increment correction demand torque when the hydraulic power steering apparatus is being operated.

10. The engine controlling apparatus according to claim 9, wherein, in the case where the external load apparatus is a load apparatus other than the hydraulic power steering apparatus, said correction unit increases or decreases the increment correction demand torque based on elapsed time after the fluctuation is detected by said detection unit.

* * * * *